(12) United States Patent
Morrow et al.

(10) Patent No.: US 12,231,303 B1
(45) Date of Patent: Feb. 18, 2025

(54) NETWORK SLICE MULTI-SERVICE MANAGER

(71) Applicant: Syniverse Technologies, LLC, Tampa, FL (US)

(72) Inventors: Monique Jeanne Morrow, Zurich (CH); Edward Yau, Tseung Kwan O (HK); Pradeep Bhardwaj, Swindon (GB)

(73) Assignee: Syniverse Technologies, LLC, Tampa, FL (US)

( * ) Notice: Subject to any disclaimer, the term of this patent is extended or adjusted under 35 U.S.C. 154(b) by 342 days.

(21) Appl. No.: 17/944,680

(22) Filed: Sep. 14, 2022

(51) Int. Cl.
*H04L 41/5009* (2022.01)
*H04W 28/24* (2009.01)
*H04W 48/18* (2009.01)

(52) U.S. Cl.
CPC ........ *H04L 41/5009* (2013.01); *H04W 28/24* (2013.01); *H04W 48/18* (2013.01)

(58) Field of Classification Search
CPC .... H04L 41/5009; H04W 28/24; H04W 48/18
See application file for complete search history.

(56) References Cited

U.S. PATENT DOCUMENTS

| | | | | |
|---|---|---|---|---|
| 10,965,461 B1* | 3/2021 | Wright | .................. | H04L 9/3239 |
| 11,265,220 B1* | 3/2022 | Kushwaha | .............. | H04L 41/12 |
| 11,284,297 B2* | 3/2022 | Barton | .................... | H04L 45/34 |
| 11,310,104 B2* | 4/2022 | Stockert | ................ | H04W 28/16 |
| 11,343,311 B2* | 5/2022 | Parvataneni | .......... | H04L 9/3265 |
| 11,386,339 B2* | 7/2022 | Liu | ........................ | H04L 67/567 |
| 11,444,683 B2* | 9/2022 | Balmakhtar | .......... | H04W 48/18 |
| 11,576,109 B2* | 2/2023 | Mhapsekar | ........... | H04W 48/16 |
| 11,606,728 B1* | 3/2023 | Yau | ........................ | H04W 76/16 |
| 12,113,674 B2* | 10/2024 | Bansal | ................ | G06F 9/45558 |

(Continued)

FOREIGN PATENT DOCUMENTS

| | | | | |
|---|---|---|---|---|
| CN | 115277004 A | * | 11/2022 | |
| CN | 114531342 B | * | 4/2024 | .......... H04L 41/046 |
| WO | WO-2021025600 A1 | * | 2/2021 | ......... H04L 41/0806 |

OTHER PUBLICATIONS

Juniper Research, "5G, Blockchain & the IoT: What's Next for Roaming Clearing Services?" https://www.youtube.com/watch?v=TqVcPVf8DFY, accessed Dec. 14, 2022.

(Continued)

*Primary Examiner* — Adam D Houston
(74) *Attorney, Agent, or Firm* — Anton J. Hopen; Smith & Hopen, P.A.

(57) ABSTRACT

This invention is a system and method for allocating and monetizing resources on a 5G infrastructure. A service manager module receiving a slice request from a client. A real-time analytics engine gauges the optimum resource path which then then requested from a resource manager. A slice offer for the resource is made to the client which is accepted. The service manager module sends a post to a distributed ledger, the post comprising a client identification, a slice identification, a provider identification, a service request, a QOS parameter, a transaction identification, a cost of service and a timestamp. Scripting software running on top of the ledger platform automatically transacts payment for the resource from the client to the provider.

17 Claims, 4 Drawing Sheets

(56) References Cited

U.S. PATENT DOCUMENTS

| | | | |
|---|---|---|---|
| 2020/0195495 A1* | 6/2020 | Parker | H04L 41/40 |
| 2022/0038289 A1* | 2/2022 | Huang | H04L 63/126 |
| 2022/0138182 A1* | 5/2022 | Yang | G06F 16/245 |
| | | | 707/703 |
| 2022/0271992 A1* | 8/2022 | Verma | H04W 48/18 |
| 2022/0368594 A1* | 11/2022 | Bansal | H04L 41/0893 |
| 2023/0010527 A1* | 1/2023 | Viswambharan | H04W 24/10 |
| 2023/0111373 A1* | 4/2023 | Chandran | H04W 76/20 |
| | | | 370/230 |
| 2023/0188200 A1* | 6/2023 | Anchala | H04B 7/18519 |
| | | | 370/316 |
| 2023/0189025 A1* | 6/2023 | Chenumolu | H04W 24/02 |
| | | | 370/241 |
| 2023/0276213 A1* | 8/2023 | Paczkowski | H04W 4/50 |
| | | | 455/406 |
| 2024/0028321 A1* | 1/2024 | Sethi | G06F 21/577 |
| 2024/0113902 A1* | 4/2024 | Michaelis | H04L 63/04 |
| 2024/0323748 A1* | 9/2024 | Altman | H04W 28/0268 |

OTHER PUBLICATIONS

Tomia, "Billing and Charging Evolution" https://www.tomiaglobal.com/billing-and-charging-evolution/, accessed Dec. 14, 2022.

Zanotto, P. "Billing and Charging Evolution (BCE): Bringing Out the Full Value of the 5G IoT Roaming" The Fast Mode, https://www.thefastmode.com/expert-opinion/26566-billing-and-charging-evolution-bce-bringing-out-the-full-value-of-the-5g-iot-roaming, accessed Dec. 14, 2022.

Platt, S. et al. CoNTe: A Core Network Temporal Blockchain for 5G. Sensors (Basel). Sep. 15, 2020;20(18):5281.

Tmforum, "Wholesale roaming settlements using blockchain" https://myaccount.tmforum.org/networks/22-0-363/index.html, accessed Dec. 14, 2022.

* cited by examiner

| Transaction ID | Slice Participant Trust Check | Slice Participant Trust Check | Slice Participant Trust Confirm | Slice Participant Trust Confirm | "Ok" to Funds Distribute All Parties | Post final to Ledger |
|---|---|---|---|---|---|---|
| Unique Transaction Identifier | • Status (pass/fail)<br>• Service provider ID<br>• Timestamp | • Status (pass/fail)<br>• Service provider ID<br>• Timestamp | • Status (pass/fail)<br>• Service provider ID<br>• Timestamp | • Status (pass/fail)<br>• Service provider ID<br>• Timestamp | | |
| ab7874478-34e2-54b7-9aca-64ec9bd6b84c | • Pass<br>• Slice Participant<br>• 05/25/2020T 12:31Z | • Pass<br>• Slice Participant<br>• 05/25/2020T 12:32Z | • Pass<br>• Slice Participant<br>• 05/25/2020T12:33Z | • Pass<br>• Slice Participant<br>• 05/25/2020T12:33Z | | |
| 787478-34e2ab-54b7-adbf-64ec9bd6b84c | • Pass<br>• Slice Participant<br>• 05/25/2020T 12:31Z | • Pass<br>• Slice Participant<br>• 05/25/2020T 12:32Z | • Pass<br>• Slice Participant<br>• 05/25/2020T12:33Z | • Pass<br>• Slice Participant<br>• 05/25/2020T12:33Z | | |
| ........ | ........ | ........ | ........ | ........ | | |

Fig. 4

NETWORK SLICE MULTI-SERVICE MANAGER

BACKGROUND OF THE INVENTION

1. Field of the Invention

This invention relates generally to the field of telecommunications and more specifically to administering network resources on a 5G network.

2. Brief Description of the Related Art

Network slicing integrates multiple virtual networks over a shared network domain. Network slicing is used most frequently in the context of 5G networks because the 5G specification calls for network slicing as a fundamental capability. In contrast, 4G and earlier generations of cellular data services did not and could not support network slicing.

Each slice of a network may have its own logical topology, security parameters and performance features. These are constrained by limits imposed by the underlying physical networks. Slices can be assigned to different objectives, such as ensuring a specific application or service receives priority access to capacity and delivery or isolating traffic for specific users or device classes. Slicing networks enables the network operator to maximize the use of network resources and service flexibility.

Each network slice is managed by a mobile virtual network operator (MVNO). The infrastructure provider (the owner or administrator of the telecommunication infrastructure) leases the physical resources to the MVNOs that share the underlying physical network. An MVNO can autonomously implement multiple network slices that are tailored to the various applications provided to its own mobile users.

Problem in the current state of the art include the complexity of orchestrating providers with resources able to fulfill network slice requests with clients seeking those resources. Another problem exists in the lack of a central trusted authority to administer and facilitate the service slice instantiation and completion process. Yet another problem is the clearing and settlement of costs for using such resources along with privacy and transparency in how resources are assigned, released and paid for.

SUMMARY OF THE INVENTION

The present invention is a multi-service manager system for allocating and monetizing resources on a 5G infrastructure. The multi-service manager system creates a layer of abstraction via a new slice signal that abides by a set protocol to raise a slice for a particular service with parameters for security, monetization and required service levels.

A trusted central authority service manager module receives a slice request from a client, the slice request includes a client identification, a service request, a quality of service (QOS) parameter, a transaction identification and a client signature. The service manager module advances the authenticated and authorized slice request to an analytics engine, the analytics engine constructs and transmits an allocation resource request to a resource manager module, the allocation resource request includes the client identification, the service request, the QoS parameter and the transaction identification. The resource manager module accepts the allocation resource request from the analytics engine and returns to the analytics engine a resource allocated confirmation from a service provider having a provider identification, the resource allocated confirmation includes a slice identification, provider identification, the QoS and the transaction identification. The analytics engine receives the resource allocated confirmation and forwards to the service manager module a slice offer including the slice identification, the provider identification, the QoS, the transaction identification and a cost of service. The service manager module forwards the slice offer to the client and from the client receives at the service manager module a slice accept response, the slice accept response includes the client identification, transaction identification and the client signature. The service manager module forwards the client accept to the analytics engine which in turn forwards to the source manager a resource confirmation including the client identification, the slice identification and the transaction identification. Finally, the service manager module sends a post to a ledger, the post includes the client identification, the slice identification, the provider identification, the service request, the QoS parameter, the transaction identification, the cost of service and a timestamp.

In embodiments of the invention, the system is agnostic as to any type of distributed ledger to which the data is posted, the ledger is substantially immutable through a consensus algorithm. In other words, the ledger is a consortium blockchain distributed at least to the client and the service provider. DLT types may include those such as Ethereum or Hyperledger Fabric for the purpose of managing multiple service slices and posting to the ledger once a service has been completed. The multi-service slice manager function is cross-domain and federated in nature. The system may further include an audit ledger storing an array of trust checks for the client in association with the transaction identification which provides a layer of security and abstraction for privacy. The ledger to which the post is made may automatically execute clearing and settlement transactions between the client and the service provider based on the client identification, the slice identification, the provider identification, the service request, the QoS parameter, the transaction identification, the cost of service and the timestamp. A smart contract acting as a wallet having a value balance on the ledger is funded by the client through a payable function sent by a call to a makePayment function and validated through a view function to the value balance of the wallet for the cost of service. Alternatively, or in addition, the smart contract transfers a portion of the value balance in the wallet to the service provider for the cost of service. In an embodiment of the system, a first post to the ledger is made when a network resource is allocated to service the slice accept response and a second post to the ledger is made when the network resource to service the slice accept response is released.

In another embodiment of the invention, a distributed ledger technology (DLT) slice multi-service manager function listens for SLA-Security-Monetization Services TAGS from a real-time analytics engine. It then evokes an MMW signal from the real-time analytics engine. The MMW signal indicates preferred path to participants in slice or close service domain. The system provides slice selection subscription data to evoke the "M" Protocol. M is for messaging and monetization against fraud spoofing. A registration response to signal MMW and "M" protocol is transmitted with "PERMIT REGISTRATION" from the DLT slice multi-service manager function. Finally, the slice parameters are posted to the ledger in the DLT where "t" time can be variable in evoked via a smart contract.

BRIEF DESCRIPTION OF THE DRAWINGS

For a fuller understanding of the invention, reference should be made to the following detailed disclosure, taken in connection with the accompanying drawings, in which.

DETAILED DESCRIPTION

In the following detailed description of the preferred embodiment, reference is made to the accompanying drawings, which form a part hereof, and within which specific embodiments are shown by way of illustration by which the invention may be practiced. It is to be understood that other embodiments may be utilized, and changes may be made without departing from the scope of the invention.

Figure 1:
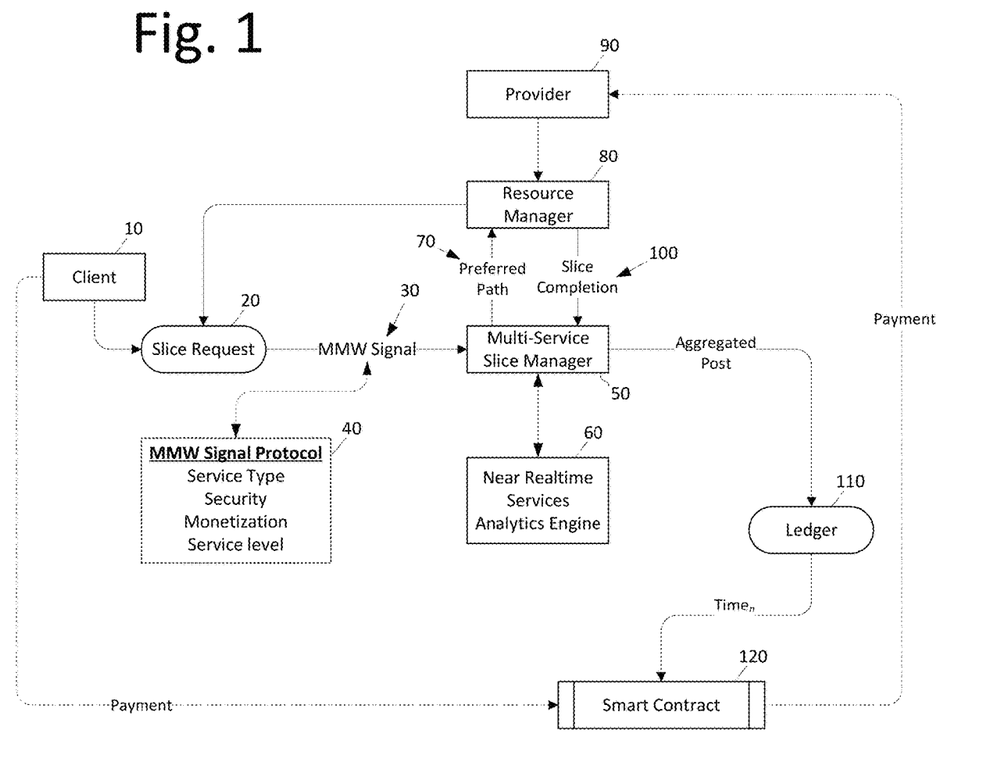
FIG. 1 is a flowchart view of an embodiment of the invention.

FIG. 1 provides a schematic depiction of an embodiment of the invention. Client 10 makes slice request 20 in the form of a MMW signal 30. An MMW signal protocol 40 comprises service type, security, monetization and service level. The MMW signal 30 is received by slice manager 50 which is communicatively coupled to analytics engine 60. Slice manager 50 orchestrates preferred path 70 to resource manager 80 to obtain service from provider 90. Upon slice completion 100 slice manager 50 generates an aggregated post to ledger 110 with time$_n$ variable which is received by smart contract 120 running on top of ledger 110 which, according to its logic, debits client 10 and credits provider 90 for the slice service.

Figure 2:
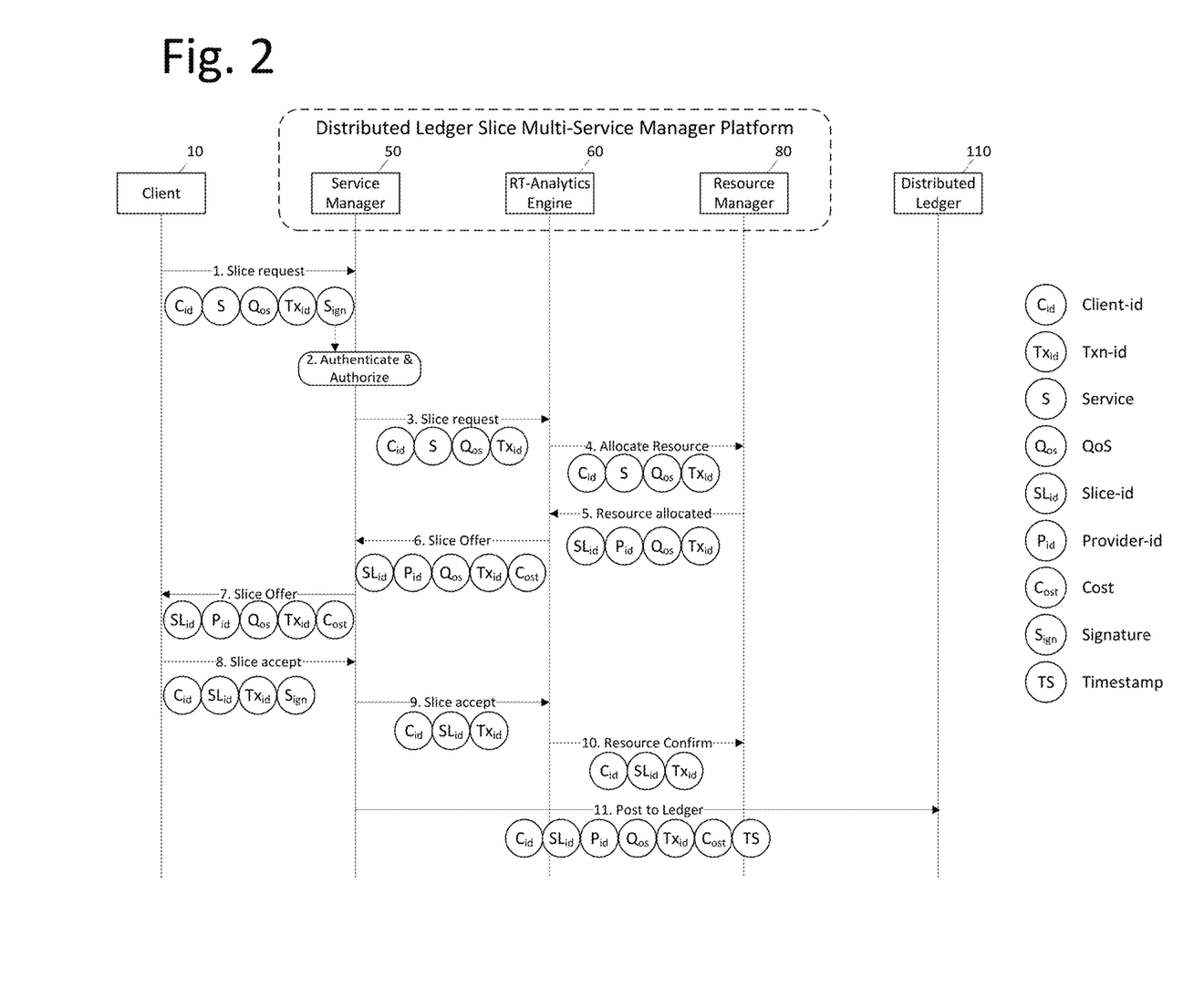
FIG. 2 is a call-flow diagram of an embodiment of the invention.

FIG. 2 illustrates a call flow of the process wherein client 10 makes a slice request to service manager 50. The slice request includes client-id, service, quality of service (QoS), transaction id (txn-id) and a client signature. Service manager 50 authenticates and authorizers the slice request which is passed onto real-time analytics engine 60. Analytics engine 60 makes a request to resource manager 80 to allocate resources to fulfill the slice request made by client 10. Resource manager 80 then allocates the resource and analytics engine 60 generates a slice offer which is returned to client 10 for acceptance. Client 10 accepts the slice offer which is confirmed with resource manager 80 and service manager 50 posts to the ledger 110 the client-id, slice-id, provider-id, QoS, txn-id, cost and a timestamp.

Figure 3:
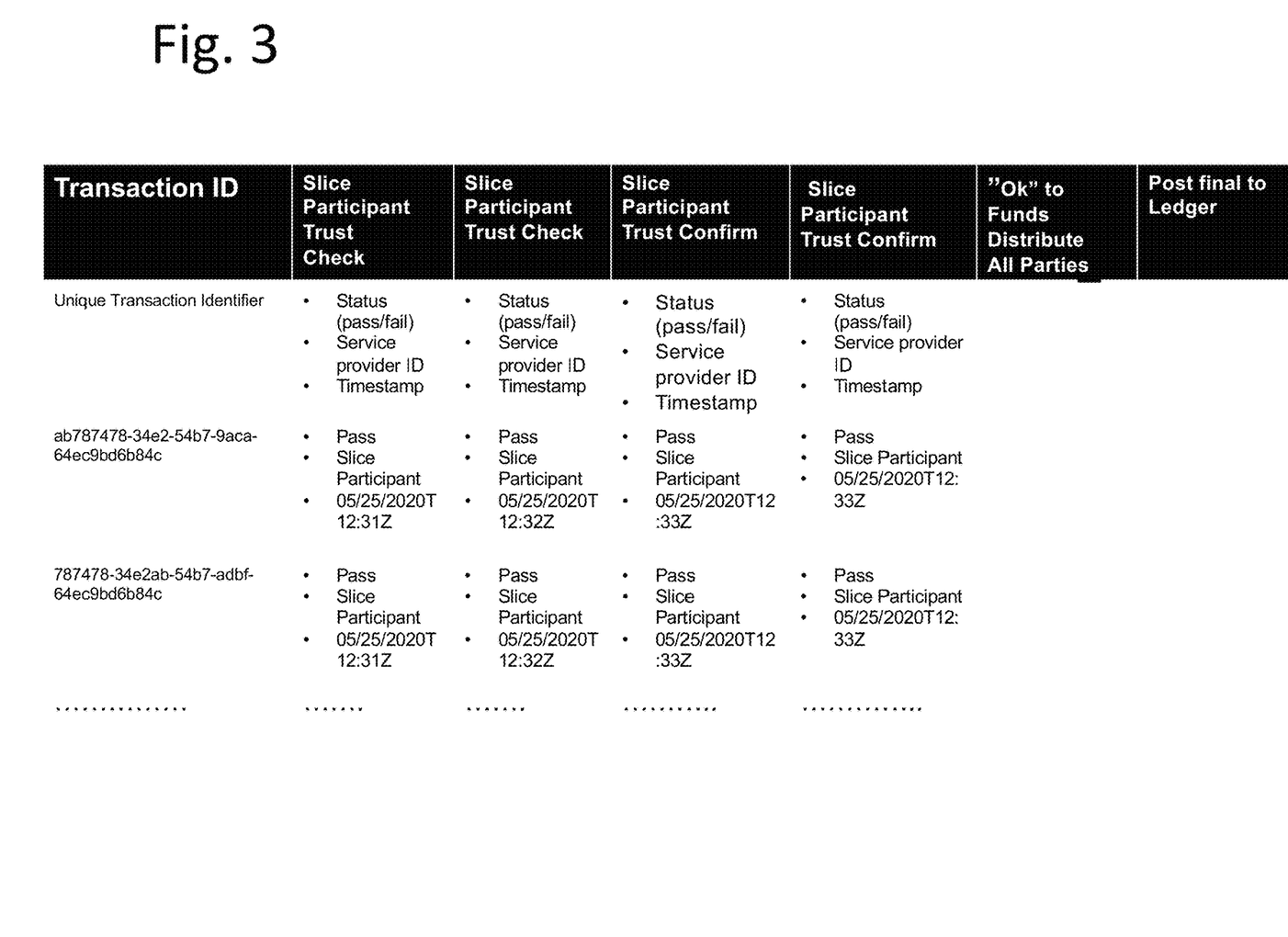
FIG. 3 is a table showing exemplary audio trail records according to an embodiment of the invention.

FIG. 3 shows exemplary audit trail records in a blockchain having no personal identifying information including sender and recipient and transaction details for privacy.

Figure 4:
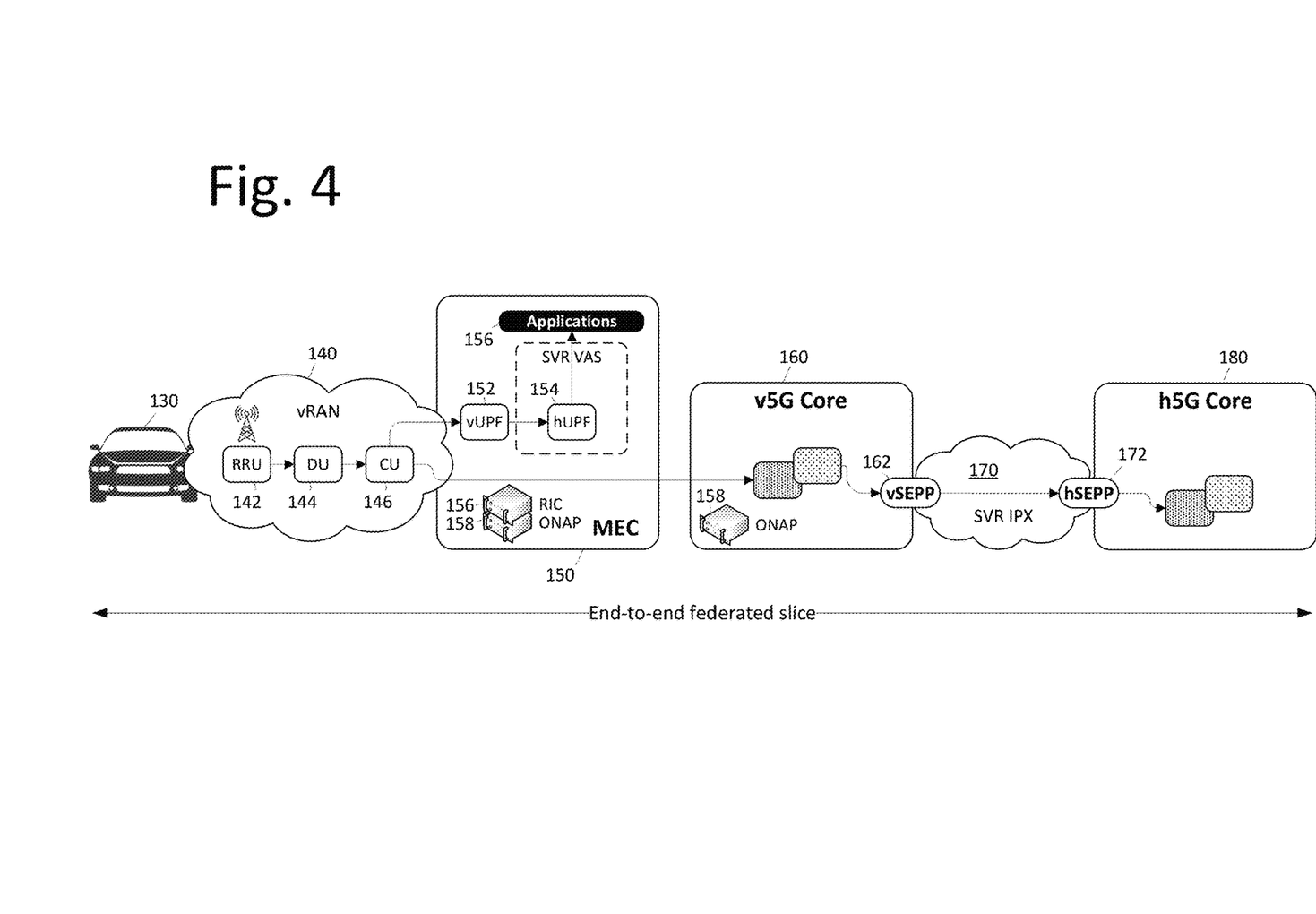
FIG. 4 is a diagrammatic view of a use case for the invention

FIG. 4 shows an end-to-end federated network slicing use case to create a network slice from virtualized microservices assembled from visited operator RAN, MEC, hosted UPF, 3rd party applications, IPX, and visited and home operator 5G cores. Vehicle 130 is coupled to a virtualized radio access network 140 (coupled generally to an MEC, multi-access edge computing system 150) having a remote radio unit 142 coupled to distributed unit 144 and centralized unit 146. Centralized unit 146 is coupled to a visiting user plane function 152 which is coupled to a home network user plane function 154 to access value added service applications 156. The MEC 150 having a RAN intelligent controller 156 operable on an open network automation platform 156 which also runs a visiting 5G Core 160. The visiting 5G core 160 connects via a visiting secure edge protection proxy 162 to a service IPX 170 network which in turns connects a home security edge protection proxy 172 to connect to a home 5G core 180. In this use scenario, the system provides authenticate functions, microservices and applications for inclusion in the slice. Usage of slice components is tracked, cleared and settled based on that usage and pre-agreed rating models.

One objective of the invention is to aggregate network slice element providers and authenticate and those elements from operators and service providers. This is achieved by the present invention with a cloud-hosted, network slice assembly engine (NSAE). The NSAE may form an edge platform for dynamic assembly of network slices in real-time. The network slice elements are connected and distributed at the edge, in the cloud and at IPX peering points. An edge application hub connects the applications and operator network at the edge. The system further collects and authenticates network splice element usage, clears customer data resources and settles payments amongst operators and service providers.

Hardware and Software Infrastructure Examples

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device. Storage and services may be on premise or remote such as in the "cloud" through vendors operating under the brands, MICROSOFT AZURE, AMAZON WEB SERVICSE, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Hardware equipment may be agnostic as to general computing or may be telecommunications-specific. Some equipment providers include those under the brands HUAWEI, CISCO SYSTEMS, NOKIA, and QUALCOMM.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages. Additional languages like ERLANG (or Open Telecom Platform, OTP) may be used or scripting languages such as PYTHON, LUA and PERL.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

Glossary of Terms

Access Point Name (APN) refers to a gateway between a GSM, GPRS, 3G or 4G mobile network and another computer network, frequently the public Internet. The APN identifies the packet data network (PDN) that a mobile data user wants to communicate with. In addition to identifying a PDN, an APN may also be used to define the type of service.

Application Function (AF) is a logical element of the 3GPP policy and charging control (PCC) framework which provides session related information to the policy and charging rules function (PCRF) in support of PCC rule generation.

Attribute Value Pair (AVP) means an information element of a Diameter Protocol message. Each Diameter message will contain multiple AVPs, such as Destination-Host AVP, Subscription ID AVP, Server-Name AVP, Framed IP Address AVP and the like.

Centralized Unit (CU) provides support for the higher layers of the protocol stack in 5G communications.

Diameter is an authentication, authorization, and accounting protocol for computer networks.

Diameter Routing Agent (DRA) is an element in a 3G or 4G (such as LTE) network that enables real-time routing capabilities so that messages are routed among the correct elements in a network. The DRA was launched by the 3GPP to address the increased Diameter signaling traffic and growing sophistication of 4G LTE networks.

Distributed Unit (DU) provides support for the lower layers of the protocol stack in 5G communications.

Evolved Node B (eNB or eNodeB) is a base station terminating the air interface on the network side. It is responsible for all radio resource management. It is also responsible for allocation of user traffic to the downlink/uplink, security and relaying of higher layer NAS (Non-Access Stratum) signaling to the MME.

Evolved Universal Terrestrial Radio Access Network (EUTRAN) is the radio (air interface) access architecture for LTE.

Fully Qualified Domain Name (FQDN) is a domain name that specifies its exact location in the tree hierarchy of the Domain Name System (DNS).

Gateway Mobile Switching Center (GMSC) is a function within a PLMN (Public Land Mobile Network). GMSC terminates the PSTN (Public Switched Telephone Network) signaling and traffic formats. It converts this to protocols used in mobile networks. For mobile terminated calls, GMSC interacts with the HLR (Home Location Register) to retrieve routing information.

General Packet Radio Service (GPRS) is a packet oriented mobile data standard on the 2G and 3G cellular communication network's global system for mobile communications (GSM).

GPRS Tunneling Protocol (GTP) is defined by 3GPP standards to carry General Packet Radio Service (GPRS) within 3G/4G networks.

HLR means Home Location Register which is a database that contains subscription data about subscribers authorized to use the GSM core network. The HLRs store details of every SIM card issued by the mobile phone operator.

Home Public Land Mobile Network (HPLMN) means the network in which a mobile subscriber's profile is held. Mobile users that roam on other networks (visiting) receive subscription information from the HPLMN.

HSS means Home Subscriber Service which implements HLR and Diameter signaling. The HSS is a central database that contains user-related and subscription-related information. The functions of the HSS include functionalities such as mobility management, call and session establishment support, user authentication and access authorization. The HSS is used in IMS and 4G while HLR is used in 2G and 3G.

IMS means IP Multimedia Subsystem, an architectural framework to standardize the delivery of voice and other multimedia services of IP packet-switched networks.

IMSI means International Mobile Subscriber Identity. It is a specification used to uniquely identify a subscriber to a mobile telephone service. It is used internally to a GSM network and is adopted on nearly all cellular networks. The IMSI is a 50-bit field which identifies the phone's home country and carrier and is usually fifteen digits. This 15-digit number has two parts. The first part is comprised of six digits in the North American standard and five digits in the European standard. It identifies the GSM network operator in a specific country where the subscriber holds an account. The second part is allocated by the network operator to uniquely identify the subscriber. For GSM, UMTS and LTE network, this number is provisioned in the SIM card and for CDMA2000 in the phone directly or in the R-UIM card (the CDMA2000 analogue to a SIM card for GSM).

Inbound Roaming means a subscriber of another network "visits" within the local (home) network but is able to use the local network to makes calls, send messages and the like. The inbound roaming service allows subscribers from other operators to access the local network and services.

Interconnect Border Control Function (IBCF) is a boundary control between various service provider networks, providing IMS network security in terms of signaling information. It enables communication between IPv4 and IPV6 SIP applications, controlling transport plane functions, network topology hiding, screening of SIP signaling, selecting an optimum signaling interconnect, and creation of charging data records.

Interrogating Call Session Control Function (I-CSCF) is responsible for onward routing of SIP messages to the appropriate S-CSCF (Serving CSCF) for a given subscriber. It is a key element in the IMS roaming methodology.

IP Exchange (IPX) means a telecommunications interconnection backbone for the exchange of IP based traffic between customers of separate mobile and fixed operators in addition to other types of service providers.

IP Short Message Gateway (IPSMGW) is an IMS application server handling SIP based messaging services for IMS subscribers.

Long-Term Evolution (LTE) is a standard for wireless broadband communication for mobile devices and data terminals, based on the GSM/EDGE and UMTS/HSPA technologies.

Media Gateway (MGW) handles the media plane (voice) in a distributed switch.

Media Gateway Control Function (MGCF) facilitates call control, interfacing the PS domain to the circuit switched domain when interworking between the IMS and PSTN is necessary.

Mobile application part (MAP) is an SS7 protocol used to access the home location register (HLR), visitor location register (VLR), mobile switching center and other components of a mobile network infrastructure.

Mobile Switching Center (MSC) means the primary service delivery node for GSM/CDMA, responsible for routing voice calls and SMS as well as other services. The MSC connects and releases end-to-end connections, administers mobility and hand-over requirements during the call and oversees charging and real-time prepaid account monitoring.

Mobility Management Entity (MME) is a component standardized within the long term evolution (LTE) system. MME provides mobility session management for the LTE network and supports authentication, handovers and roaming between subscribers and other networks.

MSISDN means Mobile Station International Subscriber Directory Number which is provisioned to a mobile device subscriber for making calls. It is the mapping of the telephone number to the SIM card (or CDMA2000 directly in the hardware) in a mobile or cellular phone and is the number normally dialed to connect a call to the mobile device. A SIM card has a unique IMSI that does not change but the MSIDN can change in time (e.g., telephone number portability).

Open Network Automation Platform (ONAP) means an open-source, orchestration and automation framework hosted by The Linux Foundation.

Outbound Roaming typically occurs when a subscriber travels to another country. That subscriber's home network has an agreement with the network he is visiting in the other country. This agreement permits the subscriber to use his mobile phone to make calls and send messages on this visiting network. The subscriber is "outbound roaming" with respect to his home network providers. Concurrently, in the view of the visited network, this subscriber is "inbound roaming." In other words, the inbound roaming service allows subscribers from other operators to access the local network and services. The outbound roaming service allows subscribers from the local network to access another operator's network and services.

Packet Data Network Gateway (PGW) is used to allocate IP addresses to the user equipment during default bearer setup.

Policy and Charging Rules Function (PCRF) is the software node designated in real-time that supports service data flow detection, policy enforcement and flow-based charging.

Proxy Call Session Control Function (P-CSCF) is a SIP proxy that is the first point of contact for user equipment in a mobile network. All SIP traffic to and from the user equipment must go through the P-CSCF. It acts as the ingress and egress point to and from a service provider's IMS domain with respect to the IMS client.

Public Switched Telephone Network (PSTN) means a circuit switched network that is used primarily for voice communications worldwide.

RAN Intelligent Controller (RIC) means a software-defined component of the Open Radio Access Network (Open RAN) architecture that's responsible for controlling and optimizing RAN functions.

Remote Radio Unit (RRU), also referred to as a Remote Radio Head (RRH), means a transceiver found on wireless base stations. These transceivers couple wireless devices with wireless networks, making it possible to send and receive text messages, among other things.

S6a Interface is Diameter interface between MME and HSS in the LTE network providing messages and procedures for phone attachment.

Security Edge Protection Proxy (SEPP) means part of the roaming security architecture that enables secure interconnect between 5G networks. The SEPP ensures end-to-end confidentiality and/or integrity between source and destination network for all 5G interconnect roaming messages. vSEPP means the interface on a visiting network and hSEPP means the interface on a home network.

Serving Call Session Control Function (S-CSCF) is the primary node in the IMS handling session control. Subscribers are assigned a S-CSCF for the duration of their IMS registration to facilitate routing of SIP messages.

Serving Gateway (SGW) routes and forwards user data packets. The SGW manages and stores UE contexts, e.g. parameters of the IP bearer service, network internal routing information.

Serving GPRS Support Node (SGSN) is a main component of the GPRS network, which handles all packet switched data within the network.

Session Initiation Protocol (SIP) is a protocol designed to establish, maintain and terminate multimedia sessions.

SIP has been adopted as the main signaling protocol in different network architectures. This SIP is deployed in 3GPP IMS (IP Multimedia System).

Signal Transfer Point (STP) is a node in an SS7 network (2G and 3G) that routes signaling messages based on their destination point code in the SS7 network.

Smart Contract means a software application (typically running on a blockchain) containing business logic and a limited amount of data. If specific criteria are met the business logic is executed. Smart contracts may be used by participants in the blockchain but often they run autonomously on behalf of the participants in the blockchain network.

Telephony application server (TAS) means a component used in the core network of a telecom network operator to provide telephony applications and additional multimedia functions. TAS provides the service logic for invoking the media servers to provide the call progress tones and announcements. If the calls originate or terminate on the PSTN, the TAS provides SIP signaling to the MGCF to instruct the media gateways to convert the PSTN TDM voice bit stream to an IP RTP stream and to direct it to the Internet protocol (IP) address of the corresponding IP phone.

Universal Mobile Telecommunications System (UMTS) Terrestrial Radio Access Network (UTRAN) means the radio technology used between mobile terminals and the base stations of 3G UMTS.

User Equipment (UE) means a mobile device connectable to a cellular telecommunications network.

User Plane Function (UPF) means the function that does all of the work to connect the actual data coming over the Radio Area Network (RAN) to the Internet. A vUPF means a partner network visiting UPF and a hUPF is a home network user plane function.

Value Added Service (VAS) means non-core services which are anything beyond standard voice calls in telecommunications.

Virtualized Mobility Management Entity (vMME) means a virtualized implementation of the main control plane entity of the network which maintains mobility state of user equipment in a network.

Virtualized radio access network (vRAN) means a radio access network (RAN) running in a virtual fashion and thus not requiring specialized hardware such as ASIC (Application Specific Integrated Circuit) or CSSP (Custom Specific Standard Product) type of System-on-Chips (SoC).

Visitor Location Register (VLR) means a database storing data about mobile phones that recently joined a particular area of a mobile operator's network. The VLR keeps track of roamed mobile phone subscribers and communications with the HLR to determine whether the mobile phone is a permanent or temporary subscriber.

Visited Public Land Mobile Network (VPLMN) means a network that a mobile subscriber roams on when leaving their Home Public Land Mobile Network (HPLMN).

Wallet means a generic application that stores private keys and can compute the existing balance of currency associated with the address(es) stored within it by querying the blockchain. A wallet may also be used to deploy a smart contract.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A multi-service manager system for allocating and monetizing resources on a 5G infrastructure, the system comprising:
    a service manager module receiving a slice request from a client, the slice request comprising a client identification, a service request, a quality of service (QOS) parameter, a transaction identification and a client signature;
    the service manager module advancing the authenticated and authorized slice request to an analytics engine, the analytics engine constructing and transmitting an allocation resource request to a resource manager module, the allocation resource request comprising the client identification, the service request, the QoS parameter and the transaction identification;
    the resource manager module accepting the allocation resource request from the analytics engine, the resource manager returning to the analytics engine a resource allocated confirmation from a service provider having a provider identification, the resource allocated confirmation comprising a slice identification, provider identification, the QoS and the transaction identification;
    the analytics engine receiving the resource allocated confirmation and forwarding to the service manager module a slice offer comprising the slice identification, the provider identification, the QoS, the transaction identification and a cost of service;
    the service manager module forwarding the slice offer to the client and from the client receiving at the service manager module a slice accept response, the slice accept response comprising the client identification, transaction identification and the client signature;
    the service manager module forwarding the client accept to the analytics engine which in turn forwards to the source manager a resource confirmation comprising the client identification, the slice identification and the transaction identification; and
    the service manager module sending a post to a ledger, the post comprising the client identification, the slice identification, the provider identification, the service request, the QoS parameter, the transaction identification, the cost of service and a timestamp.

2. The multi-service manager system of claim 1 wherein the ledger is distributed and substantially immutable.

3. The multi-service manager system of claim 2 wherein the ledger is a consortium blockchain distributed at least to the client and the service provider.

4. The multi-service manager system of claim 1 further comprising an audit ledger storing an array of trust checks for the client in association with the transaction identification.

5. The multi-service manager system of claim 1 wherein the ledger to which the post is made automatically executes clearing and settlement transactions between the client and the service provider based on the client identification, the slice identification, the provider identification, the service request, the QoS parameter, the transaction identification, the cost of service and the timestamp.

6. The multi-service manager system of claim 5 wherein a smart contract acting as a wallet having a value balance on the ledger is funded by the client through a payable function sent by a call to a makePayment function and validated through a view function to the value balance of the wallet for the cost of service.

7. The multi-service manager system of claim 5 wherein a smart contract acting as a wallet having a value balance on the ledger is funded by the client through a payable function sent by a call to a makePayment function and the smart contract transfers a portion of the value balance in the wallet to the service provider for the cost of service.

8. The multi-service manager system of claim 1 where a first post to the ledger is made when a network resource is allocated to service the slice accept response and a second post to the ledger is made when the network resource to service the slice accept response is released.

9. A multi-service manager system for allocating and monetizing resources on a 5G infrastructure, the system comprising:
   a service manager module receiving a slice request from a client, the slice request comprising a client identification, a service request, a quality of service (QOS) parameter, a transaction identification and a client signature;
   the service manager module advancing the authenticated and authorized slice request to an analytics engine, the analytics engine constructing and transmitting an allocation resource request to a resource manager module, the allocation resource request comprising the client identification, the service request, the QoS parameter and the transaction identification;
   the resource manager module accepting the allocation resource request from the analytics engine, the resource manager returning to the analytics engine a resource allocated confirmation from a service provider having a provider identification, the resource allocated confirmation comprising a slice identification, provider identification, the QoS and the transaction identification;
   the analytics engine receiving the resource allocated confirmation and forwarding to the service manager module a slice offer comprising the slice identification, the provider identification, the QoS, the transaction identification and a cost of service;
   the service manager module forwarding the slice offer to the client and from the client receiving at the service manager module a slice accept response, the slice accept response comprising the client identification, transaction identification and the client signature;
   the service manager module forwarding the client accept to the analytics engine which in turn forwards to the source manager a resource confirmation comprising the client identification, the slice identification and the transaction identification;
   the service manager module sending a post to a substantially immutable, distributed ledger on a consortium blockchain distributed at least to the client and the service provider, the post comprising the client identification, the slice identification, the provider identification, the service request, the QoS parameter, the transaction identification, the cost of service and a timestamp; and
   an audit ledger storing an array of trust checks for the client in association with the transaction identification.

10. The multi-service manager system of claim 9 wherein the ledger to which the post is made automatically executes clearing and settlement transactions between the client and the service provider based on the client identification, the slice identification, the provider identification, the service request, the QoS parameter, the transaction identification, the cost of service and the timestamp.

11. The multi-service manager system of claim 10 wherein a smart contract acting as a wallet having a value balance on the ledger is funded by the client through a payable function sent by a call to a makePayment function and validated through a view function to the value balance of the wallet for the cost of service.

12. The multi-service manager system of claim 10 wherein a smart contract acting as a wallet having a value balance on the ledger is funded by the client through a payable function sent by a call to a makePayment function and the smart contract transfers a portion of the value balance in the wallet to the service provider for the cost of service.

13. The multi-service manager system of claim 9 where a first post to the ledger is made when a network resource is allocated to service the slice accept response and a second post to the ledger is made when the network resource to service the slice accept response is released.

14. A multi-service manager system for allocating and monetizing resources on a 5G infrastructure, the system comprising:
   a service manager module receiving a slice request from a client, the slice request comprising a client identification, a service request, a quality of service (QOS) parameter, a transaction identification and a client signature;
   the service manager module advancing the authenticated and authorized slice request to an analytics engine, the analytics engine constructing and transmitting an allocation resource request to a resource manager module, the allocation resource request comprising the client identification, the service request, the QoS parameter and the transaction identification;
   the resource manager module accepting the allocation resource request from the analytics engine, the resource manager returning to the analytics engine a resource allocated confirmation from a service provider having a provider identification, the resource allocated confirmation comprising a slice identification, provider identification, the QoS and the transaction identification;
   the analytics engine receiving the resource allocated confirmation and forwarding to the service manager module a slice offer comprising the slice identification, the provider identification, the QoS, the transaction identification and a cost of service;
   the service manager module forwarding the slice offer to the client and from the client receiving at the service manager module a slice accept response, the slice accept response comprising the client identification, transaction identification and the client signature;
   the service manager module forwarding the client accept to the analytics engine which in turn forwards to the source manager a resource confirmation comprising the client identification, the slice identification and the transaction identification;
   the service manager module sending a post to a substantially immutable, distributed ledger on a consortium blockchain distributed at least to the client and the service provider, the post comprising the client identification, the slice identification, the provider identification, the service request, the QoS parameter, the transaction identification, the cost of service and a timestamp, the ledger to which the post is made automatically executes clearing and settlement transactions between the client and the service provider based on the client identification, the slice identification, the provider identification, the service request, the QoS parameter, the transaction identification, the cost of service and the timestamp.

15. The multi-service manager system of claim 14 wherein a smart contract acting as a wallet having a value balance on the ledger is funded by the client through a payable function sent by a call to a makePayment function and validated through a view function to the value balance of the wallet for the cost of service.

16. The multi-service manager system of claim 14 wherein a smart contract acting as a wallet having a value balance on the ledger is funded by the client through a payable function sent by a call to a makePayment function and the smart contract transfers a portion of the value balance in the wallet to the service provider for the cost of service.

17. The multi-service manager system of claim 14 where a first post to the ledger is made when a network resource is allocated to service the slice accept response and a second post to the ledger is made when the network resource to service the slice accept response is released.

* * * * *